United States Patent [19]
Higashi et al.

[11] Patent Number: 6,086,361
[45] Date of Patent: Jul. 11, 2000

[54] MELT TREATMENT APPARATUS

[75] Inventors: Yasuo Higashi; Katsuya Akiyama, both of Kobe; Tsuyoshi Noura; Akiyoshi Yamane, both of Osaka, all of Japan

[73] Assignee: Kabushiki Kaisha Kobe Seiko Sho, Kobe, Japan

[21] Appl. No.: 08/996,297

[22] Filed: Dec. 22, 1997

[30] Foreign Application Priority Data

Dec. 25, 1996 [JP] Japan ................................. 8-344753
Oct. 2, 1997 [JP] Japan ................................. 9-269614

[51] Int. Cl.[7] ........................................................ F27B 3/24
[52] U.S. Cl. .............................. 432/161; 373/18; 373/22
[58] Field of Search ............................ 432/13, 97, 161; 373/18, 19, 22; 219/121.37; 266/217, 218, 223, 230, 231, 236, 241

[56] References Cited

U.S. PATENT DOCUMENTS

| | | | |
|---|---|---|---|
| 4,571,259 | 2/1986 | Fey et al. ................................. | 373/22 |
| 4,634,461 | 1/1987 | Demarest, Jr. et al. .................... | 65/27 |
| 5,586,140 | 12/1996 | Ishida et al. ............................. | 373/18 |
| 5,601,427 | 2/1997 | Yuasa et al. ............................. | 432/161 |
| 5,734,673 | 3/1998 | Kurahashi et al. ....................... | 373/22 |
| 5,785,923 | 7/1998 | Surma et al. ............................ | 373/22 |

FOREIGN PATENT DOCUMENTS 2 051 325  1/1981  United Kingdom.

*Primary Examiner*—Henry Bennett
*Assistant Examiner*—Gregory A. Wilson
*Attorney, Agent, or Firm*—Reed Smith Hazel & Thomas LLP

[57] ABSTRACT

A melt treatment apparatus is provided which obviates an increase in floorspace and in cost and has freedom from a danger of steam explosion and further can control melt discharging with reliability.

The welt treatment apparatus 1 is constructed with a furnace body 8 for entry of a material 17 to be heated, a plasma torch 2 that generates a plasma arc 13 so as to melt the material, a melt discharge passage 3 arranged in the furnace body for discharging a hot melt 14 derived by melting the material with the use of the plasma torch, and cooling gas jet means 7 disposed in the melt discharge passage and jetting a cooling gas to cool the hot melt to thereby form a dam 12.

7 Claims, 14 Drawing Sheets

MELT TREATMENT APPARATUS

BACKGROUND OF THE INVENTION

1. Field of the Invention

This invention relates to a melt treatment apparatus for melting, with use of a plasma torch, a wide variety of general wastes containing inorganic matter, metal or organic matter, sewages, municipal solid wastes, ashes resulting from incineration thereof, atomic radioactive wastes of a low level and the like.

2. Description of the Related Art

A variety of general wastes containing inorganic matter, metal or organic matter, sewages, municipal solid wastes and ashes derived by incinerating the same have heretofore been disposed of as landfills in designated locations. However, because of limited space of these locations and also limited space and period for storage, a growing demand has of lately been voiced for a technique of reducing the volume of each such waste. To this end, a need exists for the development of a melt solidification method in which the waste is treated to have decreased volume and heated at a temperature of higher than the melting point thereof, followed by solidification of the melt by cooling. On the other hand, melt furnaces in common use have been designed to melt the waste by combustion of a fossil fuel chosen from kerosine, heavy oil or other hydrocarbon gas fuels. This combustion type of melt solidification, however, involves restricted combustion temperature and hence makes it difficult to subject higher-melting wastes to melt solidification.

A plasma type of heating, by contrast, can evolve a gaseous body of temperatures up to several tens of thousand centigrades through excitation of electricity, thus enabling easy heating of wastes at temperatures above their melting points. A melt treatment apparatus designed to employ such plasma heating technique is constructed basically with a melt furnace and a plasma torch mounted thereon in such a manner that a material (a waste or the like) to be heated is caused to melt by means of a plasma arc jetted out of the tip of the plasma torch.

A melt treatment apparatus is known in which by the use of a melt furnace provided with the above plasma torch, a melt is treated in a batchwise manner (see Japanese Patent Publication No. 6-94927). As seen in FIG. 13A through FIG. 13D of the accompanying drawings, a melt treatment apparatus 91 is comprised of a melt furnace 97, a furnace cover 92 and a furnace chamber 93. A plasma torch (not shown) is freely slantingly attached to the cover 92 for heating a material to be treated. A truck 96 is secured to the chamber 93 such that the latter is transported to a melt outlet where the melt is discharged. The truck 96 is provided with lifting and slanting members 94, 95 for tilting the chamber 93 in place at the melt outlet. Moreover, the melt treatment apparatus 91 has a pair of parallel rails (not shown) installed on which the truck 96 is allowed to run so as to convey the chamber 93 to the melt outlet.

The melt treatment apparatus 91 thus assembled allows the material to be heated to be molten by means of the plasma torch (not shown) as illustrated in FIG. 13A and subsequently separates the cover 92 from the chamber 93 by the action of the lifting and slanting members 94, 95 secured to the truck 96 as seen in FIG. 13B. The chamber 93 is transported to the melt outlet by the travel of the truck 96 as illustrated in FIG. 13C, and the melt is taken out with the chamber 93 tilted by the action of the lifting and slanting members 94, 95 as seen in FIG. 13D.

Further reference to FIG. 14B shows a melt furnace 102 constituted of a melt treatment apparatus 101 which has a plasma torch 103 freely slantingly disposed (see Japanese Patent Publication No. 59-116199). As has been made clear from FIG. 14A, the furnace 102 is provided at a side portion thereof with a melt outlet 105 for discharging a hot melt 106, from which melt discharge passages 107 are caused to extend for discharging the melt 106. Disposed below the melt outlet 105 are those pipes 108, 109 used to flow cooling water in order to cool and solidify the melt 106.

The melt treatment apparatus 101 discussed above is intended to melt, by means of a plasma torch, a material to be heated. Yet the melt 106 located adjacent to the inner wall of the melt furnace 102 is cooled and solidified through cooling water supplied through the pipes 108, 109 with the consequence that a dam is formed. This dam is thereafter heated to molten with use of the plasma torch 103 so that the melt 106 is caused to flow. Thus, the melt treatment apparatus 101 performs controlled flow of the melt 106 in a batchwise fashion.

The melt treatment apparatus 91 illustrated in FIGS. 13A to 13D, however, is structured in such a manner that the cover 92 is separated from the chamber 93 and also, that the chamber 93 is conveyed to the melt outlet with the aid of the truck 96. This known apparatus has the drawback that it calls for complex machinery and equipment and hence results in increased floorspace and added cost.

Additionally, the melt treatment apparatus 101 shown in FIG. 14 is contrived to cool and solidify a melt through a cooling water to thereby form a dam. When the cooling water is allowed to pass below the dam (below the melt outlet 105) as seen here, the pipes 108, 109 for running of the cooling water also become heated upon heating of the dam with use of the plasma torch 103. In this instance, where a sufficient amount of cooling water fails to run through the pipes 108, 109, the heat arising from above the dam dominantly affects such pipes, thus doing damage to the pipes or causing a hazardous explosion in the pipes of steam, namely water vapor. Furthermore, since the cooling water produces only a stationary magnitude of cooling capability, the resultant dam would in some cases get destructed depending upon varying heating conditions (a cold solid body would become molten at an area in proximity to the melt output). This has the problem that controlled discharging of the melt is not reliably attainable.

SUMMARY OF THE INVENTION

With the foregoing problems of the prior art in view, the present invention has for its object to provide a melt treatment apparatus which obviates an increase in floorspace and in cost and has freedom from a danger of steam explosion and further can control melt discharging with reliability.

According to a first important aspect of the present invention, there is provided a melt treatment apparatus comprising;

a furnace body for entry of a material to be heated;

a plasma torch that generates a plasma arc so as to melt the material;

a melt discharge passage arranged in the furnace body for discharging a hot melt derived by melting the material with the use of the plasma torch; and cooling gas jet means disposed in the melt discharge passage and jetting a cooling gas to cool the hot melt to thereby form a dam.

In the melt treatment apparatus of the invention, the melt discharge passage is arranged in the furnace body so that melt discharging can be effected by the action of gravity applied to the melt. Advantageously, this leads to simplified furnace structure with no need for complicated machinery, thus requiring no increased floorspace nor added cost. Moreover, a cooling gas is employed in cooling the hot melt with the result that a dangerous steam explosion can be avoided which has been experienced in the cooling water practice of the prior art.

In a second aspect of the present invention, the above cooling gas jet means jets the cooling gas upwardly of the dam, thereby obstructing the hot melt from tending to ride over the dam.

The hot melt if ridden over the dam can be prevented from continuing to flow out beyond an area adjacent to where the cooling gas is allowed to jet. This is attributable to the jet pressure and also to the varying heating conditions, in addition to formation of the dam. Thus, melt discharging can be reliably controlled.

In a third aspect of the present invention, the hot discharge passage is provided at its tip with a melt container and degassing means for exhausting the cooling gas from the melt discharge passage so as to prevent a rise in pressure in the latter passage.

Because the degassing means is disposed in the melt discharge passage, the pressure rise can be so precluded in the latter passage that a stable operation is ensured without gas leakage involved in an extension between the tip of the melt discharge passage and the melt container.

In a fourth aspect of the present invention, the melt treatment apparatus defined above further includes first pressure detection means disposed for detecting the internal pressure in the furnace body, second pressure detection means disposed for detecting the internal pressure in the melt discharge passage, damper means disposed in the melt discharge passage and operated to open or close in order to exhaust the cooling gas, and pressure control means disposed for adjusting the internal pressure in the melt discharge passage by manipulating the damper means when the internal pressure in the melt discharge passage rises, exceeding that in the furnace body With the damper means controlled through the pressure control means, the pressure rise in the melt discharge passage can be prevented. A stable operation is thus possible without outward leakage of the cooling gas.

In a fifth aspect of the present invention, the melt treatment apparatus further includes stop means disposed for bringing the flow of the melt to an end.

This construction can terminate or otherwise stop the flow of the melt even when the dam becomes destructed.

In a sixth aspect of the present invention, the stop means forms a fresh dam upon charging of a high-melting material in the melt discharge passage, the material having a higher melting point than does the melt.

Even in the case where the dam is destructed, this construction permits formation of a fresh dam when a high-melting material is placed in the melt discharge passage so that the flow of the melt can be terminated.

In a seventh aspect of the present invention, the stop means blocks off the melt to thereby terminate the flow of the latter upon insertion of a barrier wall in the melt discharge passage.

By the arrangement of the barrier damper inserted in the melt discharge passage, the flow of the melt can be terminated even in the case where the dam is destructed.

DESCRIPTION OF THE PREFERRED EMBODIMENTS

With reference to FIG. 1 through FIG. 12, the present invention will now be described as to its preferred embodiments.

Figure 1:
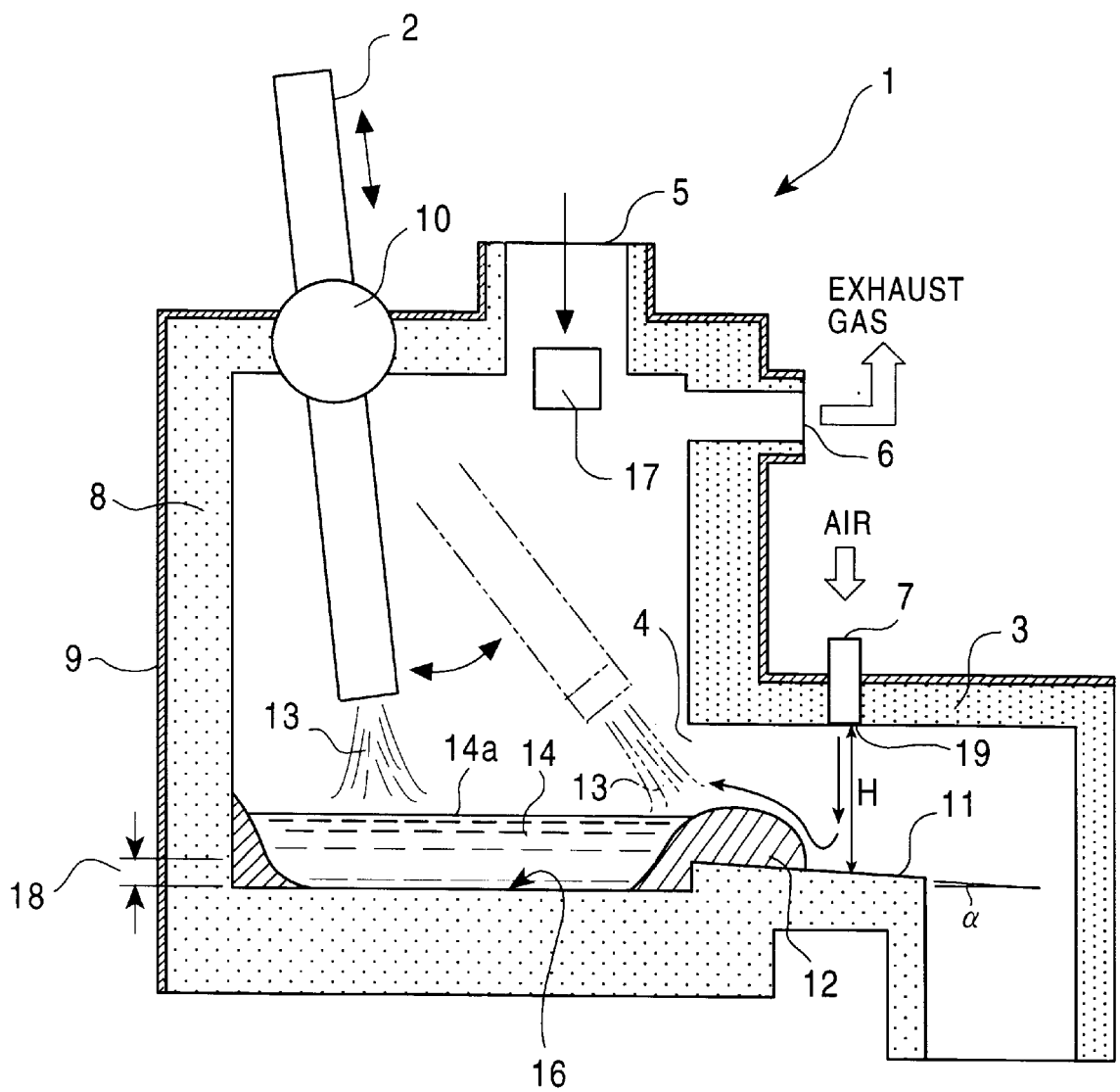
FIG. 1 schematically shows the melt treatment apparatus of the present invention for explanatory purposes.

As shown in FIG. 1, the melt treatment apparatus of the present invention as designated at 1 is constructed essentially with a furnace body 8 formed of a refractory chamber, a plasma torch 2 disposed to generate a plasma arc 13, and a compressor (cooling gas jet means) not shown but arranged to jet a cooling gas such as air or the like.

With its tip directed toward the furnace bottom, the plasma torch 2 is movably secured to the furnace body 8 on the upper surface thereof with use of a lifting-tilting combination device 10. In response to the internal furnace state checked by and transmitted from an internal furnace monitor not shown, the lifting-tilting device 10 is operated to tilt the plasma torch 2 from a position in which its tip is placed vertically of the furnace bottom to a position in which its tip is slantedly moved toward an area adjacent to a melt outlet 4. The plasma torch 2 is also movable in up-and-down manner. Here, gases for use in the plasma torch 2 may be selected from air, nitrogen and the like.

The plasma torch 2 is intended to melt a material 17 to be heated or a resultant dam 12, and no restriction is imposed upon the structure of the plasma torch 2 so long as the latter is freely moved toward an area adjacent to the melt outlet 4. Moreover, the plasma torch 2 may be structured to have a three-dimensional function other than a two-dimensional one as is illustrated in this embodiment. Electrodes for use in the plasma torch 2 are of a consumable or non-consumable type, either one of which may be suitably useful. An example of the consumable type electrode may be a graphite electrode, whereas an example of the non-consumable type electrode may be a water-cooling copper electrode.

The furnace body 8 is lined interiorly with a refractory material such as carbon, alumina, magnesia or the like. Additionally, the furnace body 8 is provided with a first exhaust gas outlet 6 for escape of an exhaust gas in the furnace body, a feed opening 5 for feeding in the furnace body 8 a material 17 to be heated, an internal furnace state monitor (not shown), and a melt outlet 4 for discharging a melt 14. Disposed on a bed 16 of the furnace body 8 are a pole (not shown but located as opposite to the plasma torch 2) and a melt base 18 (a melt bath) for storing a given amount of the melt 14. No opposite pole is needed when a non-consumable type electrode is used and when a plasma torch is used, which plasma torch can by itself irradiate a plasma arc in a continuous manner.

Disposed outwardly peripherally of the furnace body 8 (a furnace chamber, a furnace cover and if necessary a furnace bottom) is a water-cooling jacket 9 for protecting the refractory material interiorly lined on the body 8. In addition, disposed outwardly peripherally of the melt discharge passage 3 is a water-cooling jacket 9 for protecting the refractory material interiorly lined on the conduit 3.

The internal furnace monitor, (not shown) monitors the molten state of the material 17 to be heated in the furnace body 8 and transmits such state to the lifting-tilting device 10 mounted on the plasma torch 2.

Located upwardly of one of two sidewalls of the melt base 18 is a melt outlet 4 communicating with the interior of the furnace body 8 and the melt discharge passage 3 and serving to discharge the melt 14. To be more specific, the melt discharge passage 3 held in integral relation to the furnace body 8 is arranged to extend from the melt outlet 4. A bottom surface 11 of the melt discharge passage 3 is placed in an inclined posture such that the melt 14 is discharged in a shortened period of time.

The inclination of the bottom surface 11 is set to have a certain inclination angle a with respect to an outer surface 14a of the melt 14 so that the latter is allowed to flow in the direction of discharge. Here, the melt level rises to lie beyond the melt base (the melt bath) 18 and above the bottom surface 11 of the melt discharge passage 3, and this means that it is made sufficiently possible to discharge the melt 14 by virtue of its gravity even when such bottom surface is not inclined. Formation of the bottom surface 11 in an inclined shape, however, contributes greatly to further shortening of time for melt discharging. Moreover, simplified construction of the furnace body calls for no complex equipment, ultimately precluding increased floorspace and added cost. The inclination angle a can be set to meet with $0° \leq \alpha \leq 30°$ with the consequence that those refractory structures located below the melt discharge conduit 3 are less susceptible to etching and that the melt treatment apparatus 1 so damaged is more inexpensively repairable.

Figure 2:
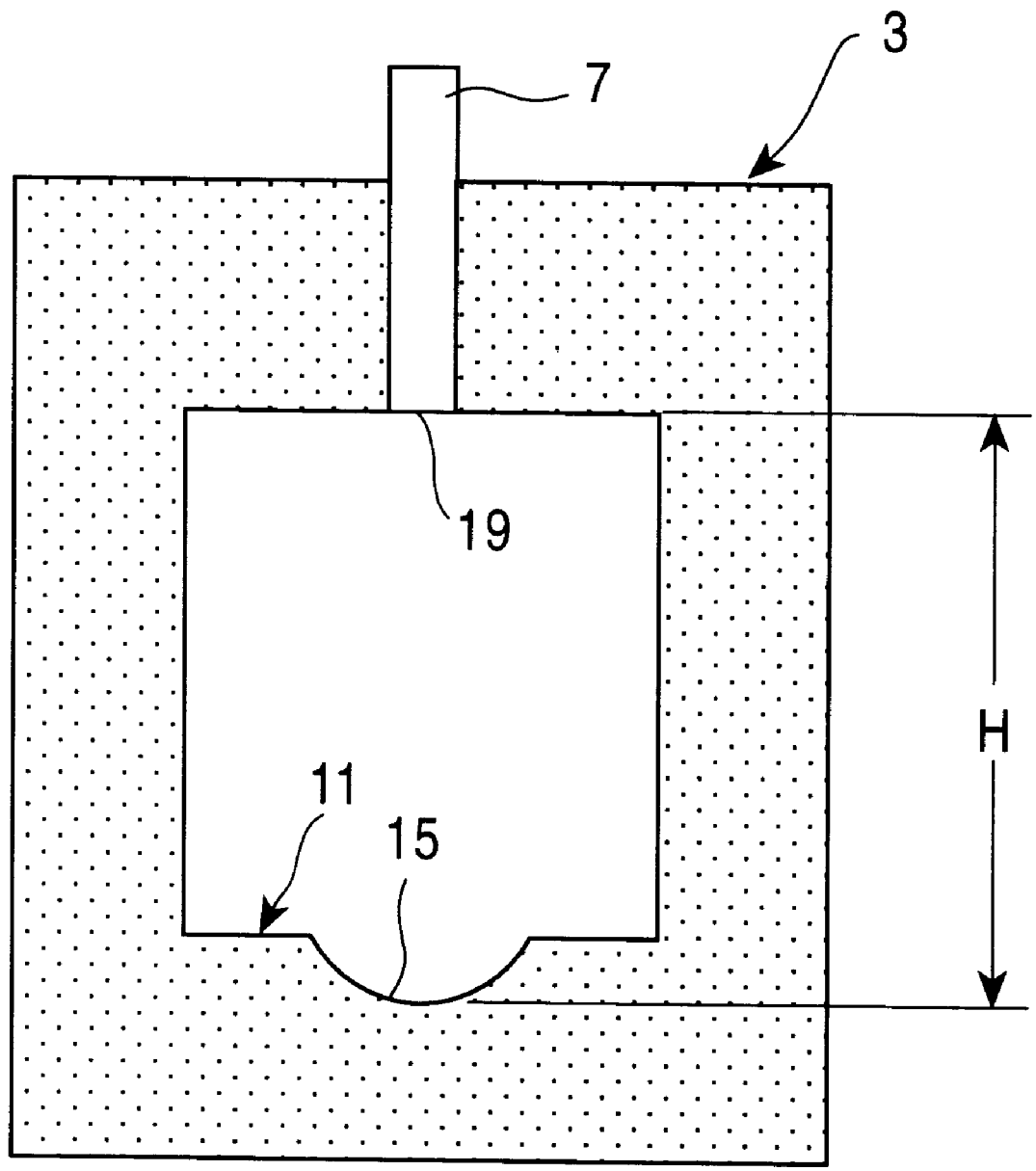
FIG. 2 is a view explanatory of a melt discharge conduit according to the invention.

As shown in FIG. 2, the bottom surface 11 of the melt discharge passage 3 has a recessed pass 15 defined to flow the melt 14 therethrough, which pass 15 may be formed of a wear-resistant material. This wear-resistant material is selected from among a refractory brick, a heat-resistant alloy and the like.

A nozzle 7 is located and directed downwardly as means for jetting a cooling gas such as air or the like (hereafter called a "cooling air"), whereby the jet pressure of the cooling air is enhanced. The nozzle 7 may be so structured as to fully raise the jet pressure of the cooling air and also to effectively counterflow the cooling air. In such instance, the tip of the nozzle 7 may be of a slitted-mouth type or of a single-mouthed type. In order to make the melt discharge passage 3 widely broad, it is desired that a plurality of singlet-mouthed nozzles be disposed to ensure uniform cooling efficiency due to both the jet pressure of and the counterflow of a cooling gas used. This is desirable in that a dam is easy to form.

Positioned upwardly of the nozzle 7 is a compressor (not shown) but acting to evolve cooling air. This compressor is so constructed that a cooling gas is caused to jet from the nozzle 7 to the melt discharge passage 3, and the melt 14 is cooled by the cooling gas to thereby form the dam 12. In the melt treatment apparatus 1 of this embodiment, the cooling air is jetted from the nozzle 7 via such compressor (not shown). The means for jetting the cooling gas may thus be of the type in which the cooling gas is jetted into the interior of the melt discharge passage 3 to thereby form the dam 12. Consequently, the cooling gas means is not limited to that illustrated here.

In the melt treatment apparatus 1 thus constructed, the material 17 adapted to be heated and supplied from a feed opening 5 is heated (melt treated) by means of a plasma arc 13 evolved from the plasma torch 2 As the melt 14 is allowed to flow beyond the melt base 18 into the melt discharge passage 3, a cooling air is jetted from the nozzle 7 connected to the compressor (not shown) so that a dam 12 is formed adjacent to the melt outlet 4 (adjacent to where the cooling air is caused to jet). When melt discharging is conducted, the dam 12 is molten to discharge the melt 14.

This embodiment constructed above can be carried out either continuously or batchwise. Explanation is offered here is concerns an operation of batchwise treatment. Prior to charging in the furnace body 8 of a material 17 to be heated, the melt base 18 is heated on its bed by the use of the plasma torch 2 and hence placed in a state sufficiently not enough to melt the material 17. Subsequent to jetting of a cooling air from the nozzle 7, the material 17 is put into the furnace body B so as to initiate melt treatment. The material 17 can be charged in a continuous way and at a constant speed, or may be put in a container such as a drum or the like and supplied at a constant interval.

The plasma arc 13 is thereafter caused to generate from the plasma torch 2, thereby heating the material 17. Due to the countercurrent heat transfer of the plasma arc 13, the region subjected to heating by such plasma arc is greatly dominated by the positioning of the plasma torch 2. For that reason, the inner furnace monitor (not shown) monitors the state of the material 17 being molten in the furnace body 8 and then transmits such molten state to the lifting-tilting device 10. Upon sensing of the molten state of the material 17, the lifting-tilting device 10 causes the tip of the plasma torch to ascend or descend and also tilt with respect to a desired position with eventual heating of the material 17 and also controlling of the speed of melt treatment. Melt treatment is continued in that way so that the melt 14 is increasingly pooled in the melt base 18, and hence, the melt level is raised. Finally, the melt 14 rises beyond the melt base 18 and then commences flowing toward the melt outlet 4.

On flowing of the melt 14 from the melt outlet 4 to the melt discharge passage 3, cooling air is jetted through the nozzle 7 from the compressor not shown, and the melt 14 is prevented from flowing due to the cooling effectiveness and jet pressure of the cooling air. That is to say, the melt 14 is not allowed to flow beyond an area where the cooling air is jetted, and cooled and solidified gradually into a dam 12. As the melt level rises, the melt 14 would sometimes ride over the dam 12 and flow into the melt discharge passage 3 but not beyond the area having undergone jetting of the cooling air. A portion of the melt 14 having ridden over the dam 12, therefore, becomes cooled and solidified on the latter dam. In such instance, the dam 12 rises upon rising of the melt level, ultimately reaching the same height as in the melt level and blocking the melt 14 against flowing. Since the flow of the melt 14 can be blocked as mentioned here, batchwise discharging of the melt 14, namely controlled discharging of such melt, is made possible.

In the batchwise treatment stated above, the cooling air is continuously jetted until melt discharging is effected. In consequence, adverse flowing of the melt 14 can be avoided which is induced from melting of the dam 12 as is in the conventional cooling practice with use of cooling water. This brings about controlled discharging of the melt 14 with utmost reliability. Such controlled discharging is further enhanced because the melt 14 can be blocked against flowing due not only to the dam 12 formed from jetting of the cooling air, but to the jet pressure of that air as well. Also advantageously, the use of cooling air prevents a dangerous steam explosion that would take place in the conventional cooling water practice.

When continuous tilting of the plasma torch 2 is done between the melt outlet 4 and the furnace center seen vertically crosssectionally, the melt 14 is allowed to flow toward the melt output 4 due to the jet pressure of a plasma arc. A portion of the melt 14 thus flowed is cooled and solidified so that a dam 12 is formed with a height of larger than that of the melt level. This dam protects the melt 14 from getting flowed, eventually ensuring controlled discharging of such melt.

As a subsequent operation, at the time discharging of the melt 14 (discharging treatment) is performed, the compressor (not shown) is stopped from working in order to stop jetting of the cooling air through the nozzle 7. Heating is then conducted with the plasma torch 2 tilted toward the melt outlet 4 so that the dam 12 is also heated to commence melting, and hence, a portion of the melt 14 blocked by the dam 12 is allowed to start discharging through the recessed pass 15. In accordance with the melt treatment apparatus 1 illustrated by this embodiment, the melt 14 is discharged by its gravity. Hence, no complicated equipment is required without an increase in floorspace and in cost.

Although this embodiment is directed to a batchwise operation, the melt treatment apparatus 1 of the present invention can of course be operated in continuous manner. The reason is that the melt 14 can be discharged without a cooling air to jet through the nozzle 7 and without the dam 12.

Figure 3:
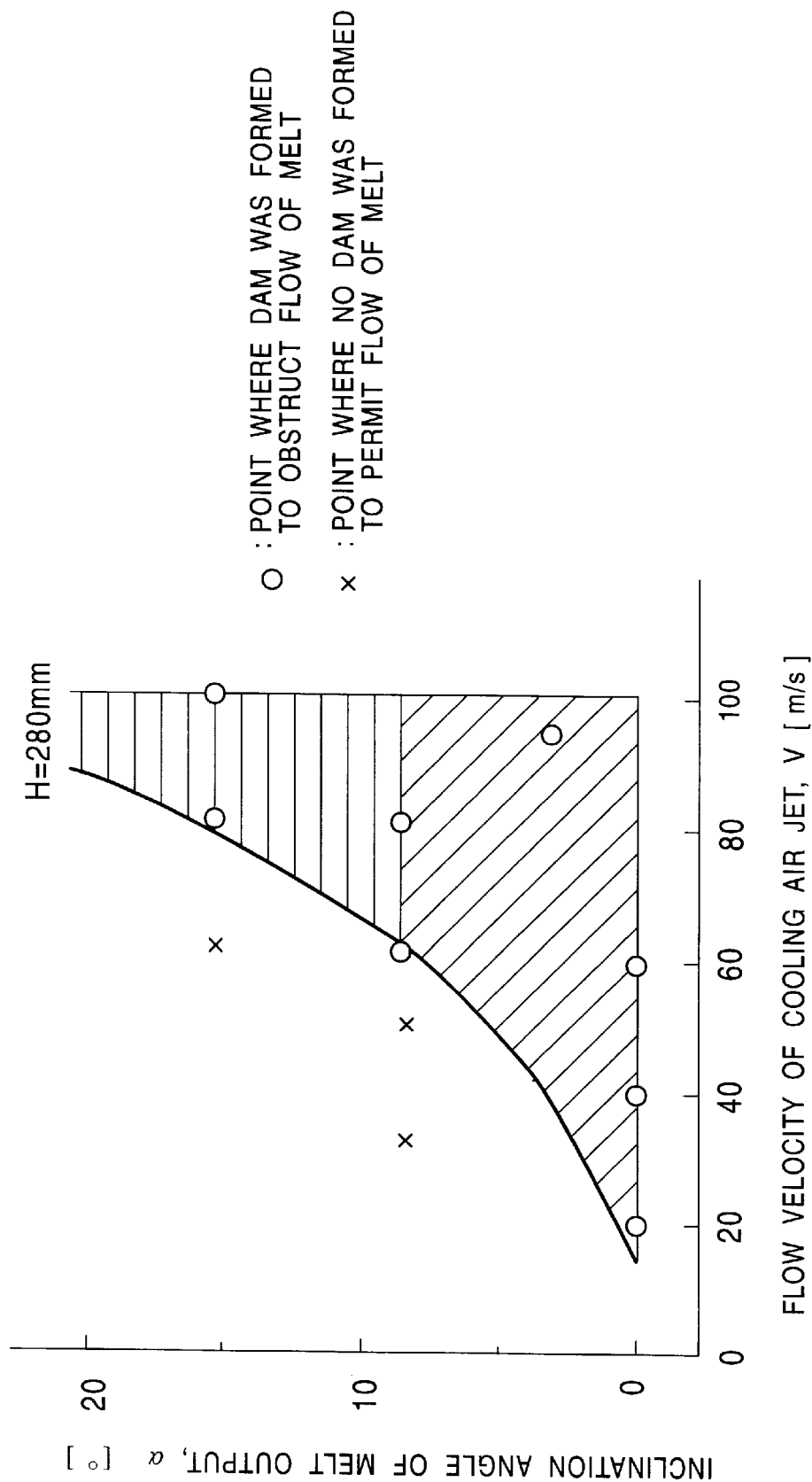
FIG. 3 graphically represents the relationship between the inclination angle of a melt discharge conduit and the flow velocity of a cooling air jet, i.e., the balanced extent in which a dam is formed to thereby obstruct the flow of a melt.
Figure 4:
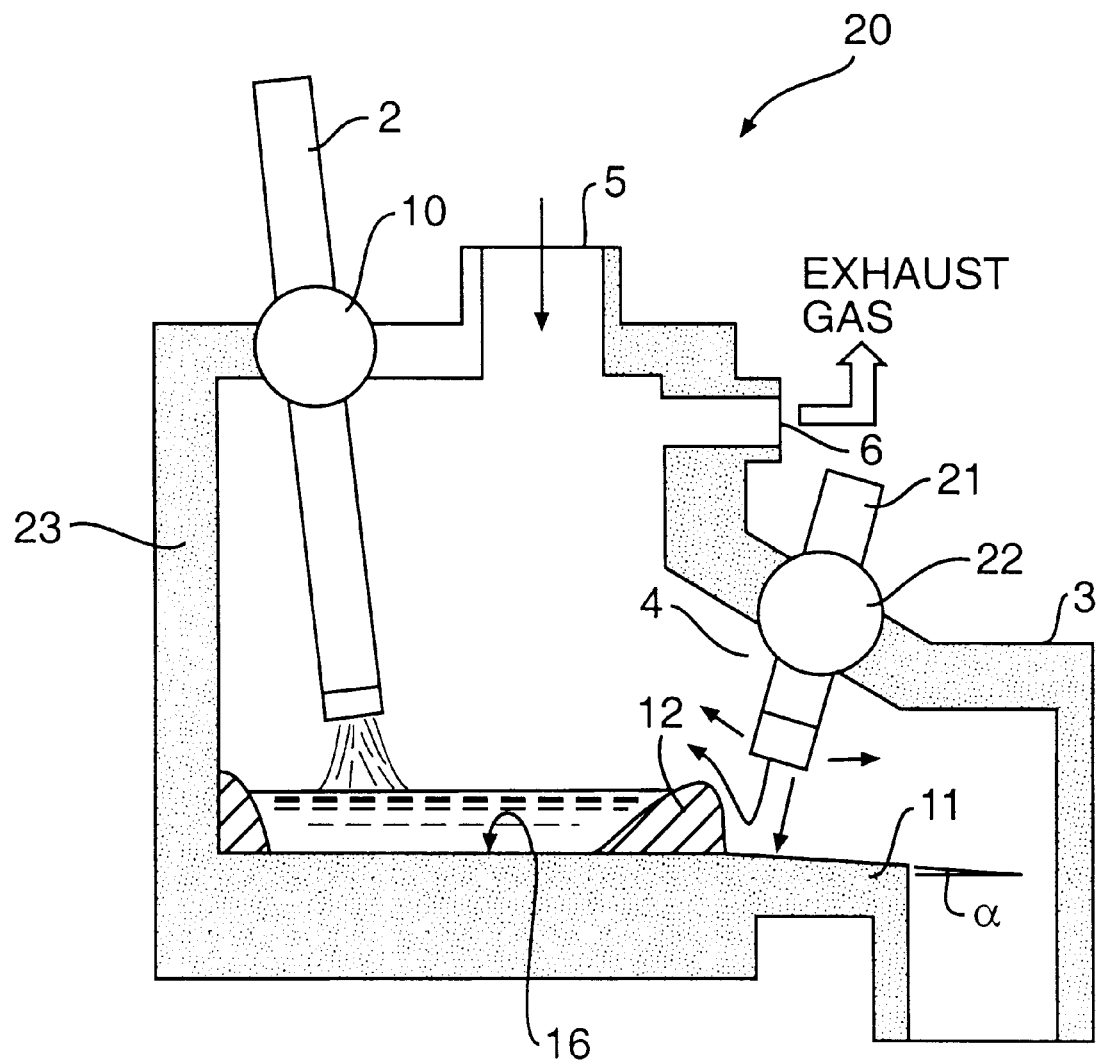
FIG. 4 is a view explanatory of the melt treatment apparatus.

In FIG. 3, the results are shown which have been obtained from examination of whether the melt 14 is blocked against flowing by the flow velocity of a cooling air jet when the inclination angle α is set at 0°, 8° and 18°, respectively, and whether the dam 12 is formed at an area adjacent to where such melt has been blocked. The symbol "o" refers to a point where the dam 12 was formed adjacent to where the cooling air was caused to jet so that the melt 14 was prevented against flowing and where melt discharging was performed upon ceasing of the cooling air jet. The symbol "x" refers to a point where the melt 14 flowed without formation of the dam 12. From these results, the relationship between the inclination angle a of the melt discharge conduit 3 and the flow velocity of the cooling air jet has been represented as a curve in FIG. 3. Both a shaded zone and a crosswise lined zone denote those ranges holding the inclination angle α and the cooling air flow velocity in balanced relation with each other. More specifically, when the values of the inclination angle α and the cooling air flow velocity are confined to those ranges, the melt 14 does not flow beyond an area undergoing jetting of the cooling air and forms the dam 12 at a region adjacent to the melt outlet 4 (adjacent to an area undergoing blowing of the cooling air).

The aforementioned curve further shows that in order to well balance the inclination angle α and the cooling air flow velocity, a larger inclination angle α needs a higher cooling air flow velocity. Namely, when the inclination angle α is larger, the melt level is higher relative to a lower portion of the shaded zone so that the potential energy of the melt 14 is larger. This means that the melt 14 flowing on the inclined bottom surface 11 of the melt discharge passage 3 has a higher discharging speed. Thus, the relationship between the inclination angle α and the cooling air flow velocity reveals that even in the case of a higher discharging speed, a dam 12 can be formed by increasing the flow velocity of cooling air with eventual blockage of the melt 14 against flowing. Though indicative of a balanced range between the inclination angle α and the cooling air flow velocity, the crosswise lined zone is undesirable since refractories below the melt discharge, conduit 3 are liable to be etched.

The curve drawn in FIG. 3 is related to a case in which a distance H between the jet point of cooling air and the blowing point of the latter air, i. e., a distance from a tip 19 of the nozzle 7 to a bottom surface of the recessed pass 15, is set at 280 mm. The curve would displace toward a left-hand side if H is shorter than 280 mm and toward a right-hand side if H is longer than 280 mm. When the value of H varies, the balanced range between the inclination angle α and the cooling air flow velocity would also displace toward a left-hand or right-hand side. In spite of this possible displacement, strict observance of the range in the shaded zone ensures that the melt 14 should not flow beyond an area undergoing jetting of the cooling air and should form a dam 12 at a region adjacent to the melt outlet 4 (adjacent to an area undergoing blowing of the cooling air). The melt treatment apparatus 1 of this embodiment is constructed, as described above, such that the dam 12 is formed by cooling the melt 14 to thereby control discharging of such melt. This apparatus, therefore, should not be considered limited to a distance H of 280 mm between the jet point of cooling air and the blowing point of the latter air.

The above embodiment is taken to illustrate one preferred form of the melt treatment apparatus according to the present invention and hence should not be construed as restrictive. Hence, in place of the compressor (not shown but arranged to jet cooling air) and the nozzle 7, a plasma torch 21 may be disposed on an outer surface of the melt discharge passage 3 in a melt treatment apparatus 20. The apparatus 20 is so structured that a plasma operating gas is caused to jet from the tip of the plasma torch 21 so as to cool a melt 14 and hence form the dam 12. This utilizes the character that permits jetting of a plasma operating gas out of the tip of the plasma torch 21. In the case where the plasma torch 21 has mounted thereon a lifting-tilting combination device 22 as in the plasma torch 2, the dam 12 can be formed at any desirable area when the plasma operating gas is allowed to jet from the tip of the plasma torch 21 placed in a tilted posture by the use of the lifting-tilting device 22.

The use of only one plasma torch 2 would in some instances make it difficult, for some mechanical reason or from the viewpoint of an internal space of the furnace body 8, to effect heating at an area adjacent to the melt outlet 4 at the time of melt discharging. Heating is easy to perform by the arrangement of the plasma torch 21. When the plasma torch 21 is ignited at its tip to jet a plasma arc 13 and then radiate the dam 12 directly, thereby melting such dam, melt discharging can be completed in a shorter period of time. Additionally, when heating is conducted while the plasma torch is being tilted in the melt discharge conduit 3, the melt discharge passage 3 can be protected against clogging which would occur during melt discharging.

Alternatively, a furnace body 23 may be suitably used in which a furnace bed 16 is arranged to be planar in shape and coextensive with the melt outlet 4 with a melt base 18 omitted. The melt treatment apparatus 20 according to the present invention is constructed such that the melt 14 is all taken out when in melt discharging. Namely, since this apparatus is not of a structure wherein the melt 14 is pooled in the melt base (the melt bath) 18, all of the melt 14 can be discharged upon melting of the dam 12.

Figure 5:
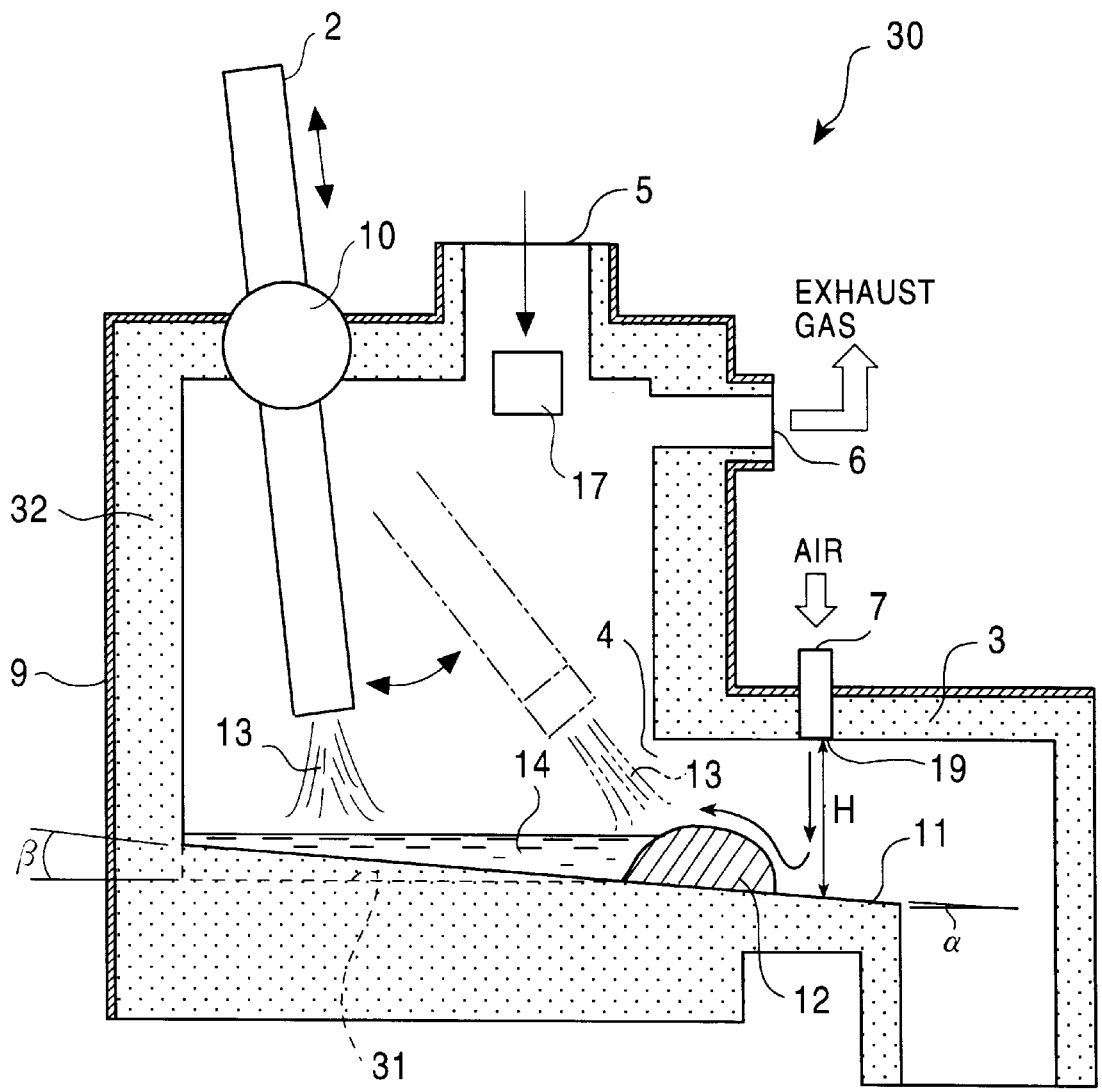
FIG. 5 is a view explanatory of the melt treatment apparatus.

A melt treatment apparatus 30 of the present invention is constructed, as seen in FIG. 5, such that a furnace bed 31 of a furnace body 32 and a bottom surface 11 of the melt discharge passage 3 are arranged to be mildly slanted. Like the bottom surface 11 of the melt discharge conduit 3, the furnace bed 31 is inclined to cause the melt 14 to be flowed thereon. The inclination angle β is $0° \leq β \leq 10°$. Here, the reason for the inclination angle β to be set in such range is that even a small angle β of inclination can flow the melt 14 toward the melt discharge conduit 3 and that a larger angle β of inclination than 10° renders it difficult to form the dam 12 on the bottom surface 11 of the melt discharge conduit 3. The inclined furnace bed 31 leads to shortened discharging of the melt 14 as well as full discharging of the letter without leaving any solidified body in the furnace bed at its corners.

Figure 6:
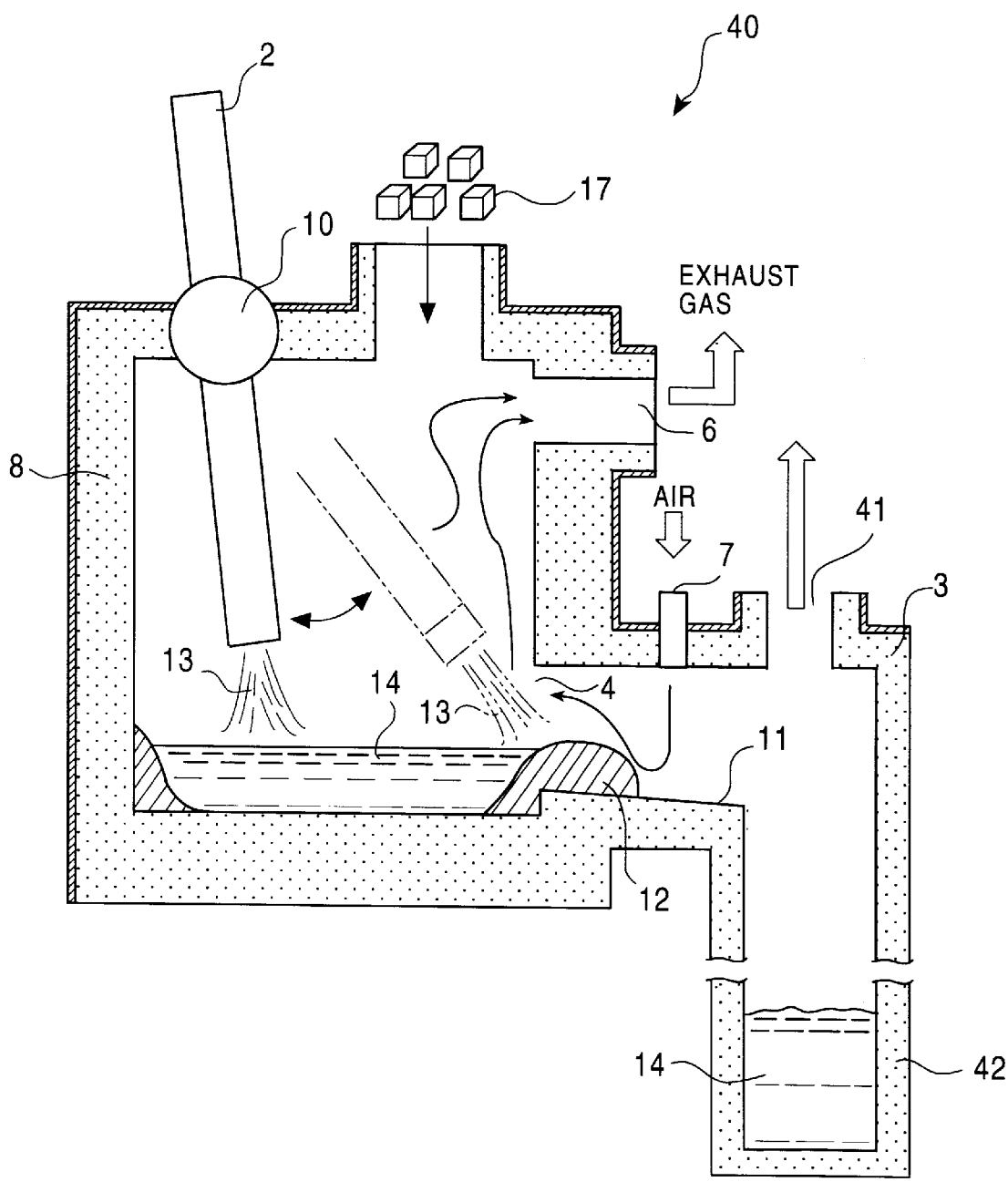
FIG. 6 is a view explanatory of the melt treatment apparatus.

A melt treatment apparatus 40 of the present invention is constructed, as seen in FIG. 6, such that in addition to the construction of the melt treatment apparatus 1 described above, a melt container 42 for accommodation of a melt 14 is located to communicate with the melt discharge conduit 3. Additionally, disposed upwardly of the melt discharge passage 3 is a second exhaust gas opening (degassing means) 41 arranged to escape an exhaust gas (inclusive of cooling air). The second exhaust gas opening 41 is provided with a second exhaust gas duct (not shown but connected thereto), which second exhaust gas duct is coupled to a first exhaust gas duct (not shown but connected with the first exhaust gas opening 6 that is disposed in the furnace body 8). Since the second exhaust gas opening 41 is disposed upwardly of the melt discharge passage 3, cooling air escapes out of the second exhaust gas opening 41 without such air back-flowing into the melt container 42 with the result that the cooling air can be prevented from leaking outwardly of the furnace body 8. The melt treatment apparatus 40 is not limited to a case in which the second exhaust gas opening 41 is defined in the construction of the second exhaust gas opening 41. The second exhaust gas opening 41 may be arranged also in the melt treatment apparatus 20, 30.

As stated above, the second exhaust gas opening 41 is disposed upwardly of the melt discharge passage 3. This is because the cooling air can be prevented from back flow which tends to take place when the pressure in the melt discharge conduit 3 rises as the dam 12 grows. More specifically, when the material 17 continues to be heated in a batchwise treatment, the dim 12 grows upon exposure to cooling air jetted from the nozzle 7. In this instance, the melt outlet 4 arranged to communicate with the interiors of the furnace body 8 and of the melt discharge passage 3 is blocked by the dam 12 so that a difference in pressure occurs in the furnace body 8 and in the melt discharge passage 3. Namely, when the dam 12 is of small dimensions (when the melt outlet is not blocked), the cooling air passes through the interior of the furnace body 8 and escapes out of the first exhaust gas opening 6. When the dam 12 grows, the melt output 4 is blocked by such dam so that the cooling air becomes less apt to flow in the furnace body 8, thus causing a rise in internal pressure in the melt discharge passage 3. Thus, the cooling air in the melt discharge passage 3 back-flows into the melt container 42, ultimately leaking outwardly out of a joint between the melt container 42 and the melt discharge passage 3. In the batchwise treatment, continued heating of the material 17 involves outward leakage of the cooling air. In the case where the material 17 to be heated is a harmful material such as a radioactive waste or the like, the cooling air contains the harmful material. Hence, this sort of cooling air, should necessarily be avoided against leakage.

As has been shown in FIG. 6, the first exhaust gas opening 6 is defined in a furnace wall located upwardly of the melt discharge passage 3. The reason for this positioning is to prevent reduced heating efficiency of the material 17 to be heated. Namely, when the first exhaust gas opening 6 is positioned above the melt discharge passage 3, the cooling air having passed through the melt outlet 4 continues to upwardly flow as such without cooling an outer surface of the melt 14, eventually escaping out of the first exhaust gas opening 6. Thus, the heating efficiency of the material 17 to be heated can be prevented against reduction.

Figure 7:
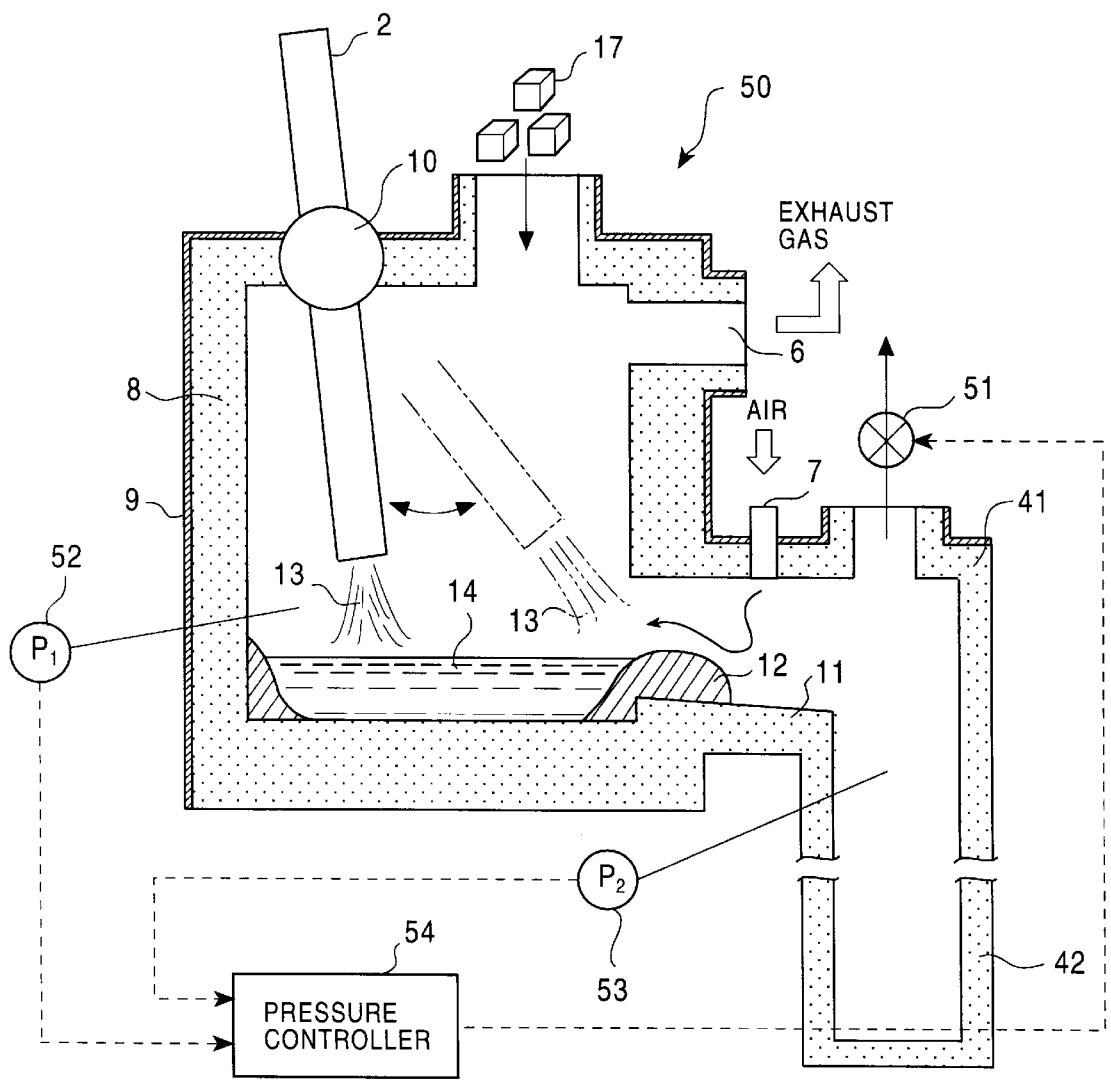
FIG. 7 is a view explanatory of the melt treatment apparatus.

A melt treatment apparatus 50 according to the present invention is constructed, as illustrated in FIG. 7, such that in addition to the construction of the melt treatment apparatus 40 mentioned above, an open-close type pressure adjustment damper (switch means) 51 is mounted on the second exhaust gas opening 41. In the melt treatment apparatus 50, a first manometer for the internal pressure of the furnace body (first internal pressure detection means for the furnace body) 52 is disposed on an inner wall surface of the furnace body 8 for measuring an internal pressure P1 of such furnace body, and a second manometer for the internal pressure of the melt discharge conduit (second internal pressure detection means for the melt discharge conduit) 53 is disposed on an inner wall of the melt discharge passage 3 for measuring an internal pressure P2 of such melt discharge conduit. A pressure controller (pressure control means) 54 is also located outwardly of the furnace body 8. The pressure controller 54 sensors those signals detected by the above manometers, thus controlling the pressure adjustment damper 51 to open or close the same. When the pressure P2 in the melt discharge passage 3 rises as the dam 12 grows, the pressure controller 54 operates to open the pressure adjustment damper 51 in order to escape exhaust gas. The heating efficiency of the material 17 to be heated can be protected against reduction. Moreover, with the pressure controller 54 provided, the pressure adjustment damper 51 may be utilized as an emergency safety device if the pressure abnormally rises in the melt discharge passage 3. The pressure adjustment damper 51 is usually closed, and the second exhaust gas opening 41 is operatively used.

Figure 8:
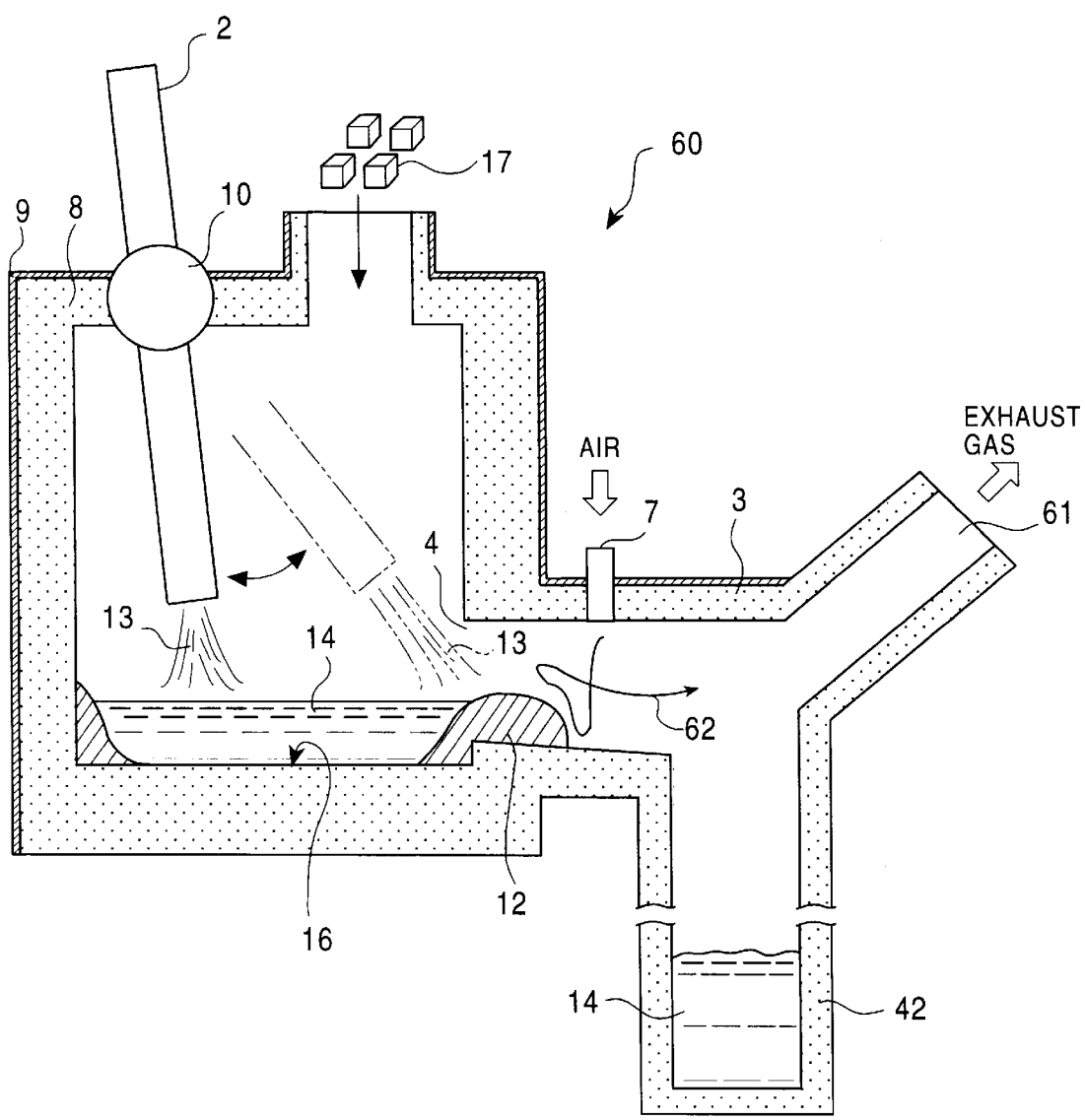
FIG. 8 is a view explanatory of the melt treatment apparatus.
Figure 9:
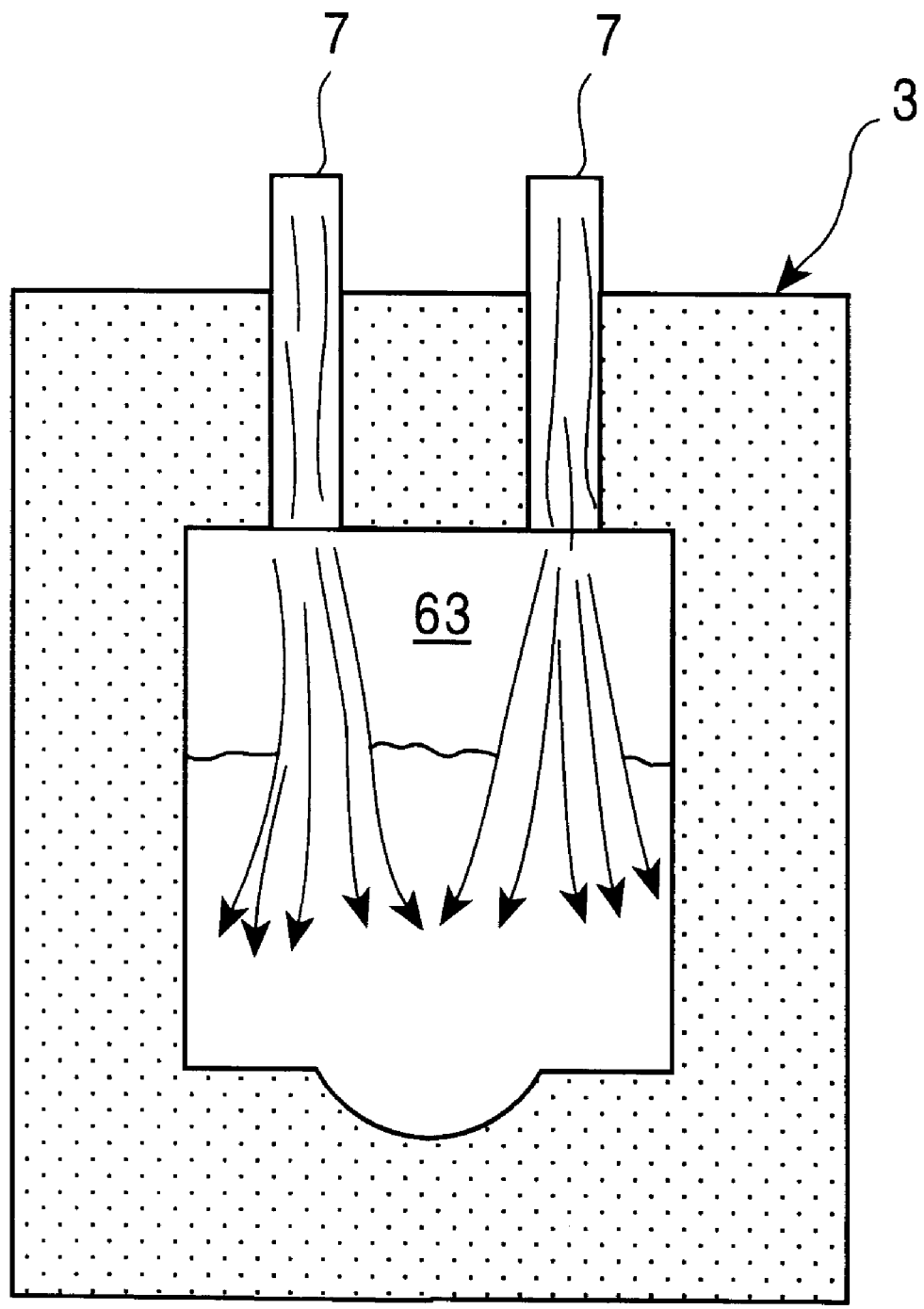
FIG. 9 is a view explanatory of the state in which the cooling air is being jetted in the invention.

A melt treatment apparatus 60 of the present invention is constructed, as illustrated in FIG. 8, such that only the second exhaust gas opening 61 is arranged upwardly of the melt discharge passage 3 with the first exhaust gas opening 6 omitted. In such construction, the melt outlet 4 should be positioned at such a sufficient elevation that it does not get completely closed even when the height of the dam 12 becomes large due to a batchwise treatment. Here, cooling air jetted from the nozzle 7 collides with the dam 12, flowing toward a second exhaust gas opening 61 (as indicated by an arrow 62) and then escaping therefrom. Thus, the cooling air does not flow into the furnace body 8, nor does it cool an outer surface of the melt 14, and this avoids reduced heating efficiency of the material 17 in the furnace body 8. Further, since the cooling air does not flow into the furnace body 8, volatile matter derived from the material 17 to be heated is less likely to deposit in the vicinity of the melt outlet 4 with the result that clogging of the melt discharge conduit 3 is avoidable. The cooling air is jetted in diverged form from the nozzle 7 as seen in FIG. 9, and a space 63 is defined adjacent to the tip of the nozzle 7. Exhaust gas in the furnace body 8 thus passes through the melt outlet 4 and escapes from the second exhaust gas opening 61.

Figure 10:
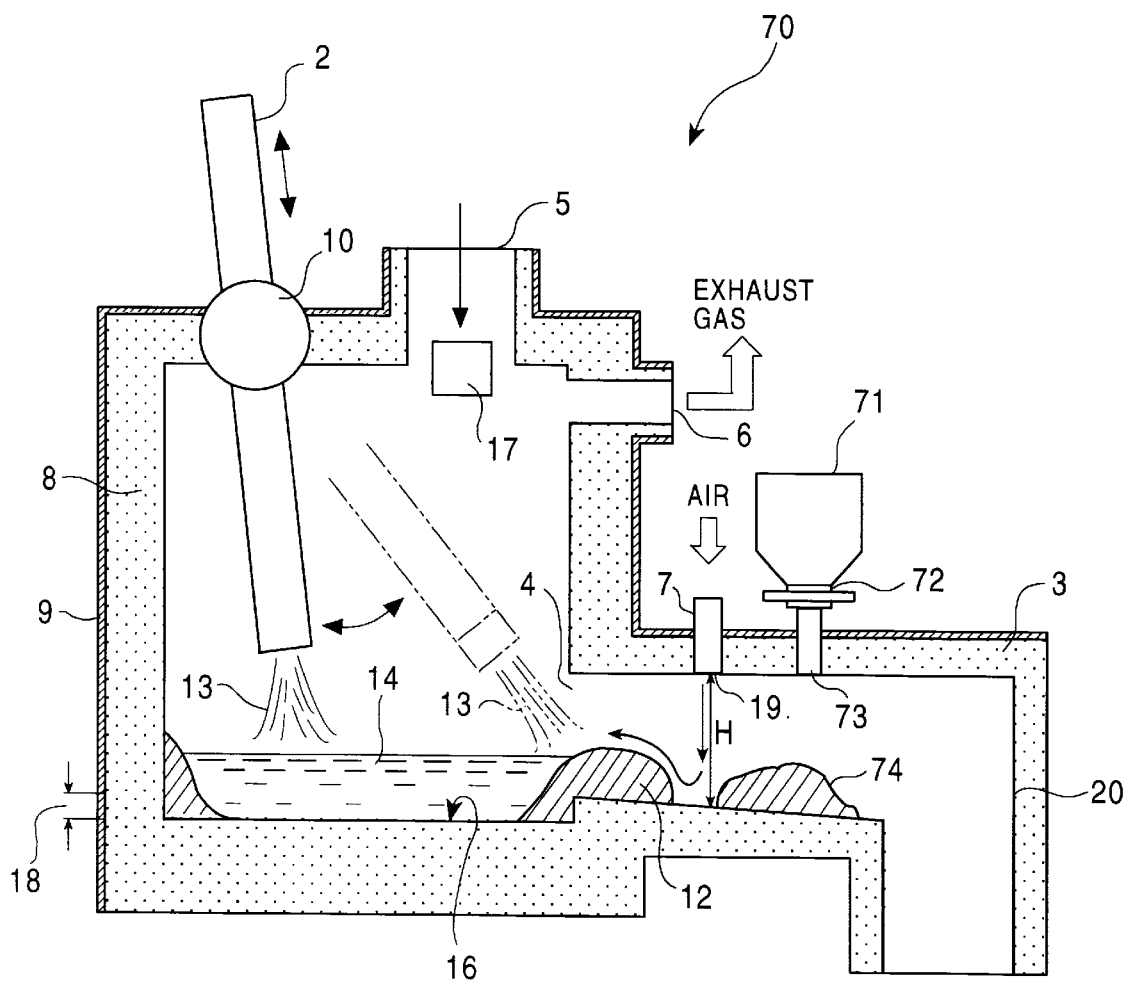
FIG. 10 is a view explanatory of the melt treatment apparatus.

A melt treatment apparatus 70 of the present invention is constructed, as shown in FIG. 10, such that a hopper (termination means) 71 is disposed upwardly of the melt discharge passage 3. Disposed above the melt discharge conduit 3 is a charge opening 73 communicating with an opening of the hopper 71. A slide gate 72 is attached to the opening of the hopper 71 so that when the slide gate 72 is opened, sand, water and the like stored in the hopper 71 are put on to the bottom surface 11 of the melt discharge passage 3. In this case, even if the dam 12 gets destructed by mismanipulation of the plasma torch 2 or the like during batchwise treatment, the slide gate 72 is opened to put sand or water on to the bottom surface of the melt discharge passage 3 with ultimate immediate formation of a dam 72 so that discharging of the melt 14 in the furnace body 8 is terminated.

Figure 11:
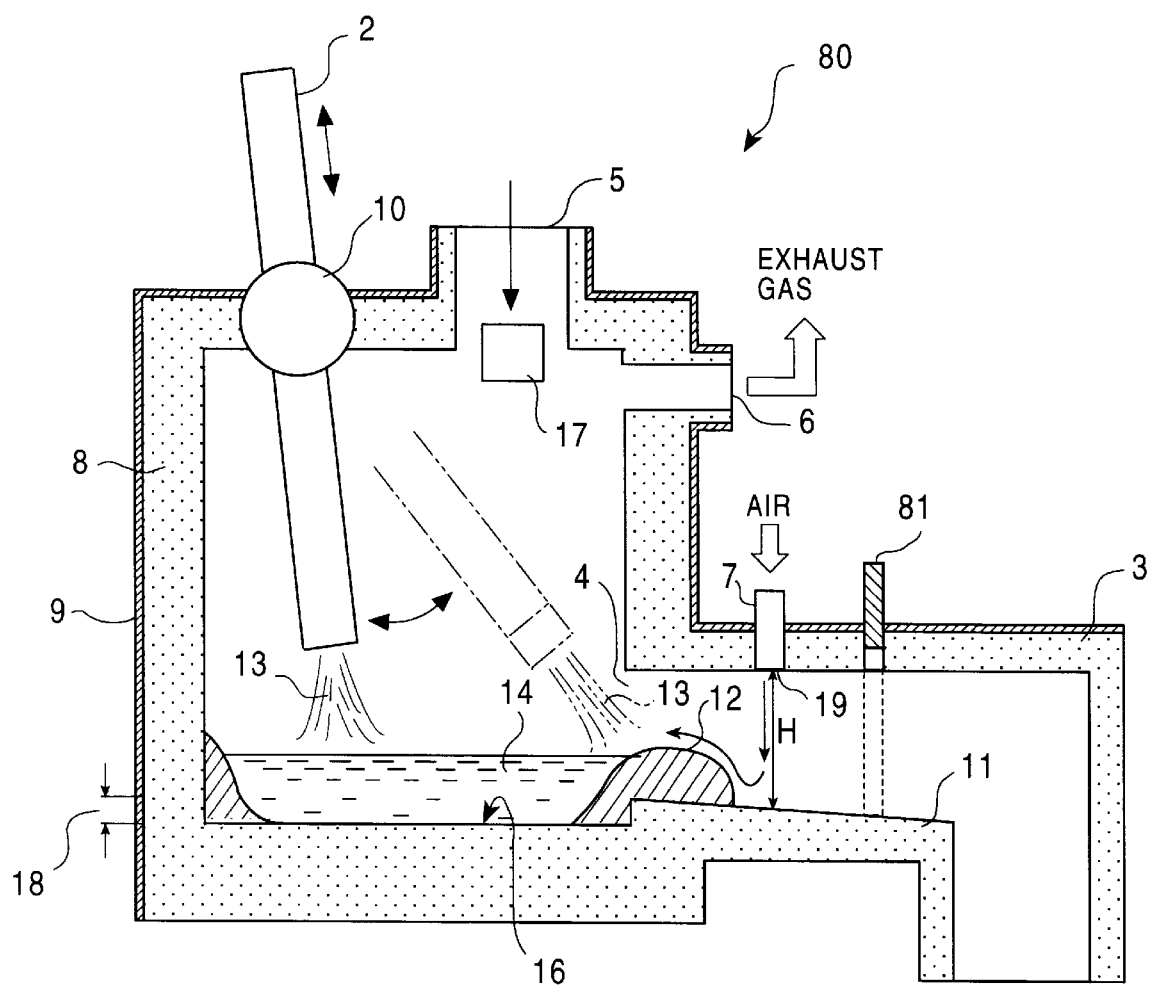
FIG. 11 is a view explanatory of the melt treatment apparatus.
Figure 12:
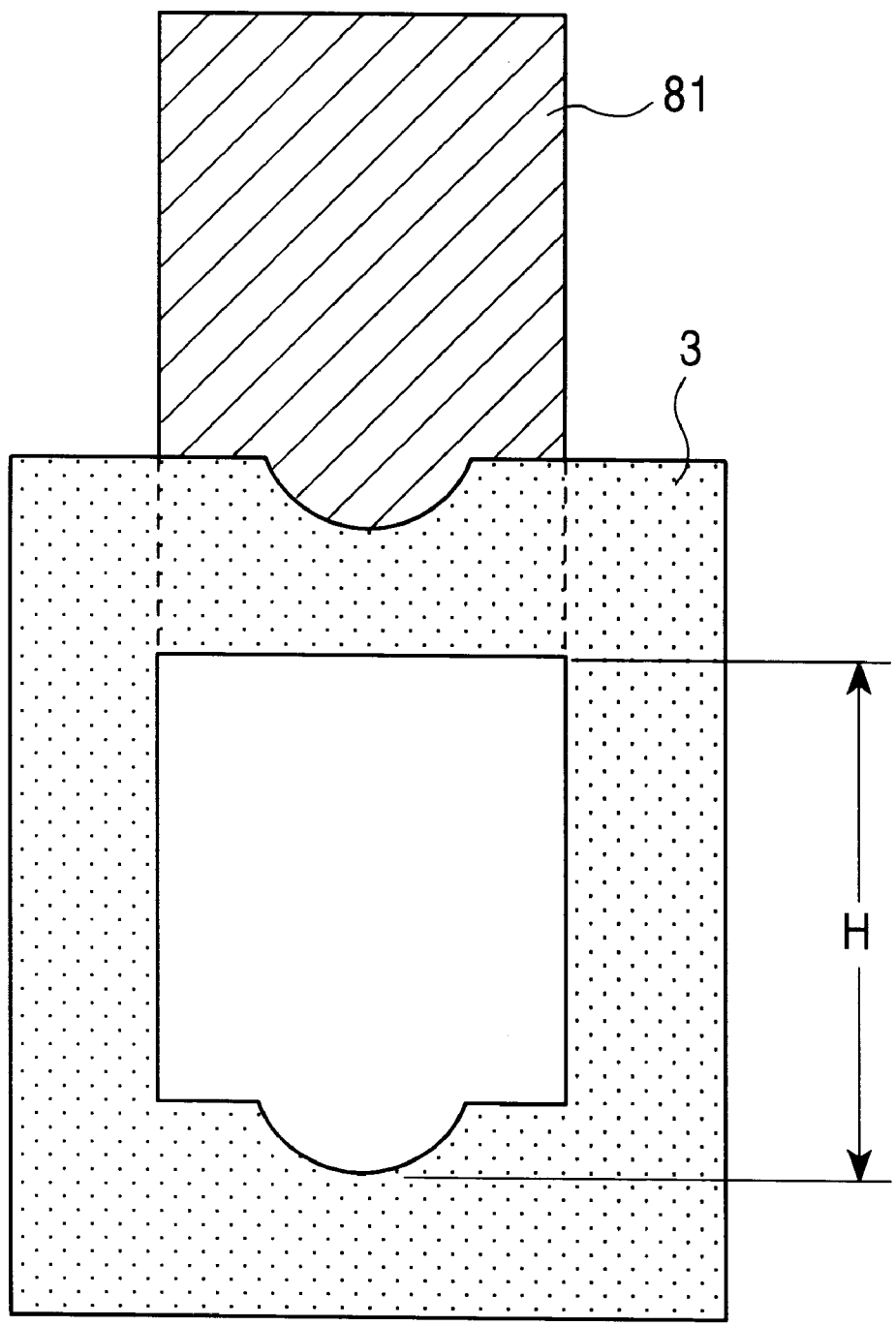
FIG. 12 is a view explanatory of a barrier wall according to the invention.
Figure 13A:
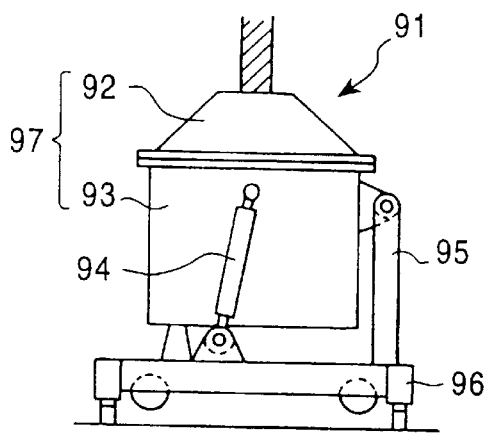
FIG. 13A to FIG. 13D schematically show one melt treatment apparatus of the prior art to explain the process steps of melt discharging.
Figure 13B:
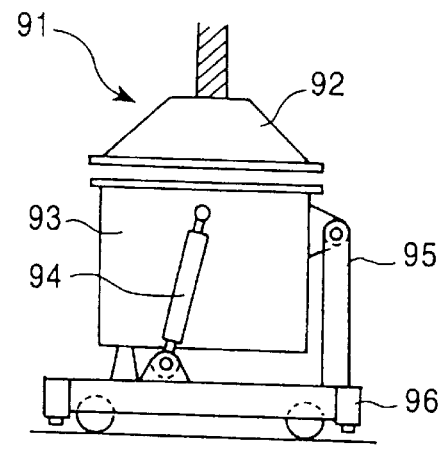
Figure 13C:
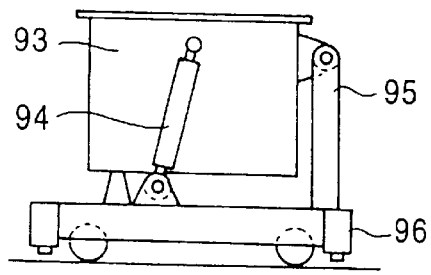
Figure 13D:
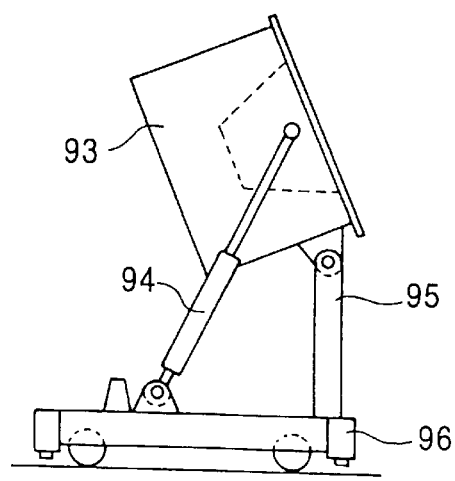
Figure 14A:
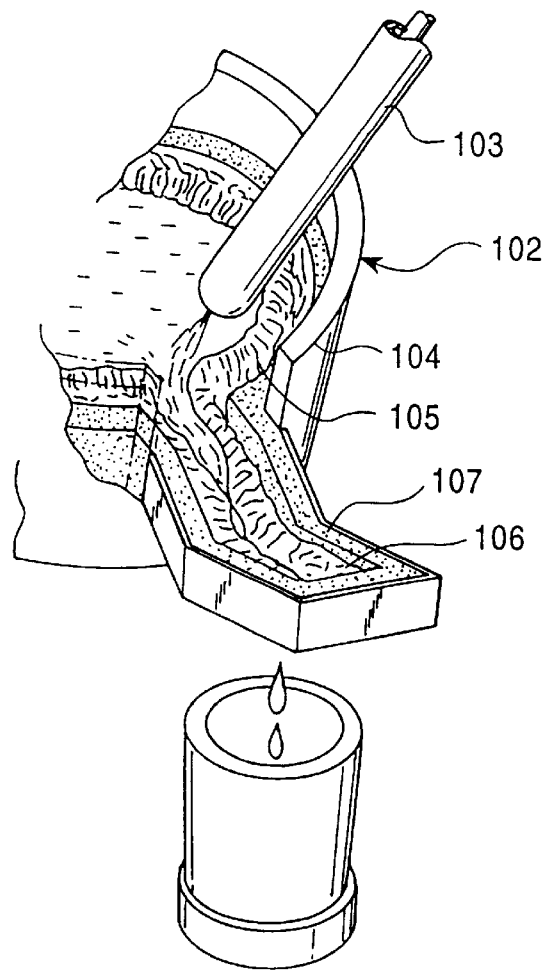
FIG. 14A to FIG. 14C are views explanatory of the process steps of melt discharging in another melt treatment apparatus of the prior art.
Figure 14B:
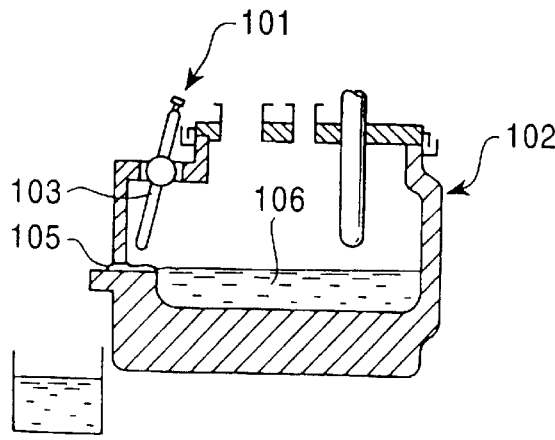
Figure 14C:
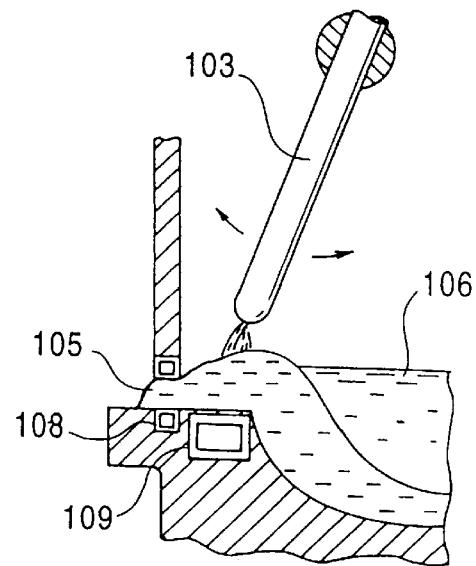

A melt treatment apparatus 80 of the present invention is constructed, as illustrated in FIGS. 11 and 12, such that in place of the hopper 71, a barrier wall damper (termination means) 81 is disposed above the melt discharge passage 3. In the case of destruction of the dam 12, the barrier wall damper 81 is inserted into the melt discharge passage 3, and hence, it is made possible to terminate discharging of the melt 14 in the furnace body 8. Even if the dam 12 gets destructed by mismanipulation of the plasma torch 2 or the like during batchwise treatment, the melt discharge passage 3 is completely blocked by insertion of the barrier wall damper 81. Hence, it is made possible to terminate discharging of the melt 14 in the furnace body 8.

In place of the barrier wall damper 81, a barrier wall formed of an inorganic structure such as brick or the like may be pressed against the bottom surface of the melt discharge passage 3 so that it is made possible to terminate discharging of the melt 14.

According to a first invention recited in claim 1 of the appended claims, there is provided a melt treatment apparatus comprising a furnace body for entry of a material to be heated, a plasma torch that generates a plasma arc so as to melt the material, a melt discharge passage arranged in the furnace body for discharging a hot melt derived by melting the material with the use of the plasma torch, and cooling gas jet means disposed in the melt discharge passage and jetting a cooling gas to cool the hot melt to thereby form a dam.

In the melt treatment apparatus of the invention, the melt discharge passage is arranged in the furnace body so that melt discharging can be effected by the action of gravity applied to the melt. Advantageously, this leads to simplified furnace structure with no need for complicated machinery, thus requiring no increased floorspace nor added cost. Moreover, a cooling gas is employed in cooling the hot melt with the result that a dangerous steam explosion can be avoided which has been experienced in the cooling water practice of the prior art.

In a second invention of claim 2, the above cooling gas jet means jets the cooling gas upwardly of the dam, thereby obstructing the hot melt from tending to ride over the dam.

The hot melt if ridden over the dam can be prevented from continuing to flow out beyond an area adjacent to where the cooling gas is allowed to blow. This is attributable to the blowing pressure and also to the varying heating conditions, in addition to formation of the dam. Thus, melt discharging can be reliably controlled.

In a third invention of claim 3, the hot discharge passage is provided at its tip with a melt container and degassing means for exhausting the cooling gas from the melt discharge passage so as to prevent a rise in pressure in the latter passage.

Because the degassing means is disposed in the melt discharge passage, the pressure rise can be so precluded in the latter passage that a stable operation is ensured without gas leakage involved in an extension between the tip of the melt discharge passage and the melt container.

In a fourth invention of claim 4, the melt treatment apparatus defined above further includes first pressure detection means disposed for detecting the internal pressure in the furnace body, second pressure detection means disposed for detecting the internal pressure in the melt discharge passage, damper means disposed in the melt discharge passage and operated to open or close in order to exhaust the cooling gas, and pressure control means. disposed for adjusting the internal pressure in the melt discharge passage by manipulating the damper means when the internal pressure in the melt discharge passage rises, exceeding that in the furnace body.

With the damper means controlled through the pressure control means, the pressure rise in the melt discharge passage can be prevented. A stable operation is thus possible without outward leakage of the cooling gas.

In a fifth invention of claim 5, the melt treatment apparatus further includes stop means disposed for bringing the flow of the melt to an end.

This construction can terminate or otherwise stop the flow of the melt even when the dam becomes destructed.

In a sixth invention of claim 6, the stop means forms a fresh dam upon charging of a high-melting material in the melt discharge passage, the material having a higher melting point than does the melt.

Even in the case where the dam is destructed, this construction permits formation of a fresh dam when a high-melting material is placed in the melt discharge passage so that the flow of the melt can be terminated.

In a seventh invention of claim 7, the stop means blocks off the melt to thereby terminate the flow of the latter upon insertion of a barrier wall in the melt discharge passage.

By the arrangement of the barrier damper inserted in the melt discharge passage, the flow of the melt can be terminated even in the case where the dam is destructed.

What is claimed is:
1. A melt treatment apparatus comprising:
   a furnace body for entry of a material to be heated;
   a plasma torch that generates a plasma arc so as to melt said material;
   a melt discharge passage arranged in said furnace body for discharging a hot melt derived by melting said material with the use of said plasma torch; and cooling gas jet means disposed in said melt discharge passage and jetting a cooling gas to the hot melt to cool said hot melt to thereby form a dam.

2. The apparatus according to claim 1, wherein said cooling gas jet means includes means for jetting the cooling gas upwardly of said dam, thereby obstructing said hot melt from tending to ride over said dam.

3. The apparatus according to claim 1 or 2, wherein said melt discharge passage is provided at its tip with a melt container and degassing means for exhausting the cooling gas from said melt discharge passage so as to prevent a rise in pressure in the passage.

4. The apparatus according to claim 1, further comprising first pressure detection means for detecting an internal pressure in said furnace body, second pressure detection means for detecting an internal pressure in said melt discharge passage, damper means disposed in said melt discharge passage and operated to open or close for exhausting the cooling gas, and pressure control means for adjusting the internal pressure in said melt discharge passage by manipulating the damper means when the internal pressure in said melt discharge passage rises and exceeds the internal pressure in said furnace body.

5. The apparatus according to claim 1, further comprising means for stopping the flow of said melt.

6. The apparatus according to claim 5, wherein said stop means forms a fresh dam upon charging of a high-melting material in said melt discharge passage, said high-melting material having a higher melting point than said melt.

7. The apparatus according to claim 6, wherein said stop means blocks off said melt to thereby terminate the flow of the melt upon insertion of a barrier wall in said discharge passage.

* * * * *